US007280612B2

United States Patent
Saed

(10) Patent No.: US 7,280,612 B2
(45) Date of Patent: Oct. 9, 2007

(54) DIGITAL BRANCH CALIBRATOR FOR AN RF TRANSMITTER

(75) Inventor: Aryan Saed, Ottawa (CA)

(73) Assignee: Zarbana Digital Fund LLC, Wilmington, DE (US)

( * ) Notice: Subject to any disclaimer, the term of this patent is extended or adjusted under 35 U.S.C. 154(b) by 665 days.

(21) Appl. No.: 10/627,881

(22) Filed: Jul. 25, 2003

(65) Prior Publication Data

US 2005/0018787 A1    Jan. 27, 2005

(51) Int. Cl.
*H04K 1/02* (2006.01)
(52) U.S. Cl. .................. 375/296; 375/295; 375/297; 375/226; 455/114.3; 455/125
(58) Field of Classification Search ............... 375/146, 375/221, 222, 226, 268, 271, 295, 300, 302, 375/296, 232, 233; 330/149, 151, 52, 124 R, 330/295, 136, 2; 455/114.3, 163.1, 125
See application file for complete search history.

(56) References Cited

U.S. PATENT DOCUMENTS

| | | | | |
|---|---|---|---|---|
| 5,381,108 A | * | 1/1995 | Whitmarsh et al. | 330/2 |
| 5,722,056 A | * | 2/1998 | Horowitz et al. | 455/126 |
| 5,748,678 A | * | 5/1998 | Valentine et al. | 375/297 |
| 6,054,894 A | * | 4/2000 | Wright et al. | 330/149 |
| 6,313,703 B1 | * | 11/2001 | Wright et al. | 330/149 |
| 6,794,938 B2 | * | 9/2004 | Weldon | 330/149 |
| 6,798,844 B2 | * | 9/2004 | Ratto | 375/296 |
| 6,885,241 B2 | * | 4/2005 | Huang et al. | 330/149 |
| 6,885,709 B1 | * | 4/2005 | Dartois | 375/297 |
| 7,062,233 B2 | * | 6/2006 | Huttunen | 455/114.3 |
| 2003/0001672 A1 | | 1/2003 | Cavers et al. | 330/149 |
| 2003/0011427 A1 | | 1/2003 | Cavers et al. | 330/149 |
| 2003/0030487 A1 | | 2/2003 | Johnson et al. | 330/52 |

* cited by examiner

*Primary Examiner*—Chieh M. Fan
*Assistant Examiner*—Siu M Lee
(74) *Attorney, Agent, or Firm*—Stolowitz Ford Cowger LLP

(57) ABSTRACT

The present invention provides a digital (computational) branch calibrator which uses a feedback signal sensed from an RF transmit signal path following the combining stage of LINC circuitry of a transmitter to compensate for gain and phase imbalances occurring between branch fragment signals leading to the combiner. The calibrator feeds a quiet (zero) base band signal through the transmit path during the calibration sequence (i.e. a period when data is not transmitted) and adjusts the phase and gain of the phasor fragment signals input thereto by driving the sensed output power to zero. The calibration is performed by alternating phase and gain adjustments with predetermined (programmable) and multiple update parameters stages (speeds). A baseband modulation is preferably used to distinguish false leakage (e.g. due to local oscillator, LO, feed through and DC offset in the base band Tx) from imbalance leakage.

8 Claims, 3 Drawing Sheets

US 7,280,612 B2

DIGITAL BRANCH CALIBRATOR FOR AN RF TRANSMITTER

FIELD OF INVENTION

The invention generally relates to devices and modules for radio frequency (i.e. "RF" or "wireless") transmitters and, in particular, a digital (computational) branch calibrator configured for compensating for fragment signal gain and phase imbalances (misalignment) created in branch signal paths extending between signal fragmentation and combining stages of a transmitter. The invention is specifically applicable but not limited to a branch calibrator for use in a Chireix-type power amplification system.

BACKGROUND

The need for efficiency is a particularly important design factor for the highly integrated requirements of transceivers used for wireless local area networks (LANs) and employing non-constant envelope modulation formats such as OFDM (Orthogonal Frequency Division Multiplex) which produce signals having relatively high peak-to-average power ratios. The assignee of this invention and application has developed computational transmitter circuitry (referred to herein as the digital front-end of the transmitter) which includes a phasor fragmentation engine for performing computational signal processing on such OFDM information signals. The phasor fragmenter deconstructs the signals after modulation (transformation) by an IFFT operational stage, into independent component ("fragment") signals which have lower peak-to-average power ratios for more efficient processing by the analog circuitry (performing RF modulation and amplification/combining) than would be achieved by the original information signals from which they derive.

Chireix-type power amplifiers, being well-known to persons skilled in the art, are particularly suited for use with this computational transmitter circuitry. The Chireix architecture represents one of the LINC (Linear amplification with Nonlinear Components) architectures and uses linear, saturated, or switch-mode amplifiers to provide amplification for signals, such as OFDM signals, having amplitude as well as phase modulation. It operates by adjusting the phase of an RF waveform applied to two amplifiers, and combining the outputs through a combiner to reintroduce the amplitude modulation. While the Chireix architecture provides certain advantages, the interchip connection between the RF front end and the power amplifier with combiner (PA/C) introduces undesirable phasor gain and phase imbalances (misalignment between the two signals as they proceed independently along that path). In the past these imbalances have been addressed through the use of analog calibrators within the RF analog circuitry but the design of such analog circuits is very difficult and the effectiveness of such designs has not been good.

Therefore, there is a need for transmitter circuitry which enables the use of a Chireix-type amplifier architecture to advantage but provides improved calibrator circuitry to compensate for such phasor gain and phase imbalances.

There is also a need for means which would enable computational calibration in contrast with the problematic, conventional analog environment for RF signal calibration circuits.

SUMMARY OF THE INVENTION

The present invention provides a digital (computational) branch calibrator which uses a feedback signal sensed through a passive coupler in the RF transmit signal path following the combining stage of LINC circuitry of a transmitter to compensate for gain and phase imbalances occurring between branch fragment signals leading to the combiner.

Advantageously, the calibrator provided by this invention adjusts the phase and gain of the signals input thereto by driving the probed output power to zero, without the presence or use of a special test signal, intentional tones or data.

Also advantageously, the calibrator performs calibration by alternating phase and gain adjustments with programmable and multiple update parameters stages (speeds). This allows a finding of the tougher 'minima' in the 'error surface' (these being the technical terms used in the field of optimization).

A calibrator according to this invention uses a baseband modulation to distinguish false leakage (e.g. due to local oscillator, LO, feed through and DC offset in the base band Tx) from actual leakage due to imbalance.

In addition, the digital processing performed by the calibrator allows the signal level at at least one DAC of the DAC pair to be pinned to a specified level, typically that level which is the maximum supported by the DAC, to ensure maximum use of the range of the DAC. This reduces quantization noise and maximum drive (input power level) into at least one of the branch power amplifier's (PA's) to improve the overall efficiency of the power amplifier with combiner (PA/C).

In accordance with the invention there is provided a digital branch calibrator for use in an RF transmitter for compensating for phase and/or gain imbalances between two phasor fragment signals in a transmit path from a phasor fragmenter, in a digital front end of the transmitter, to a power amplification and combining component, in an analog front end of the transmitter outputting an RF transmit signal based on a sum of the fragment signals. A closed loop controller operates during a calibration sequence, defined by a predetermined number of control loop iterations, and comprises transmit and feedback signal paths. The transmit signal path is configured for transmitting a zero base band transmit signal. The feedback signal path is configured for receiving a feedback signal correlated with a power level of the output RF transmit signal. The transmit signal path comprises a phase and/or gain adjusting component configured for adjusting the phase and/or gain of the phasor fragment signals to minimize the power level, the adjusting being performed iteratively to the end of the calibration sequence and resulting in sequence phase and/or gain update signals which are provided for updating the phase and/or gain of data signals transmitted through the transmit signal path. Digital signal processing means operates the controller and controls the transmission of the zero base band transmit signal for processing by the calibrator.

The closed loop controller preferably includes false imbalance removal means for removing from the feedback signal any portion thereof correlating to local oscillator and/or other non-imbalance feed through energy at the carrier frequency. The false feedback removal means comprises a digital modulator/demodulator configured for modulating the zero base band signal by a sub-carrier frequency signal and for demodulating the feedback signal.

The phase and/or gain adjusting component may include a complex accumulator configured for decimation of the feedback signal. Preferably, the phase and/or gain adjusting is performed by alternating iterations of phase adjustments and iterations of gain adjustments. The phase adjusting may use a phase gradient calculated from the magnitude of the feedback signal, the sign of the differential of the phase adjustment from one iteration to the next iteration and the sign of the differential of the magnitude of the feedback signal from one iteration to the next iteration and the gain adjusting may use a gain gradient calculated from the magnitude of the feedback signal, the sign of the differential of the gain adjustment from one iteration to the next iteration and the sign of the differential of the magnitude of the feedback signal from one iteration to the next iteration.

Preferably, the gain update signal(s) are calculated so as to limit the magnitudes of the phasor fragment signals to a predetermined maximum value L and so that the magnitude of at least one of the phasor fragment signals has the value L.

Another aspect of the invention provides an RF transmitter having a LINC architecture and comprising a digital front end with a fragmenter configured for fragmenting an input signal into a plurality of output fragment signals which sum to the input signal, and an analog front end for amplification and combining of the fragment signals, the transmitter comprising a calibrator according to foregoing and further comprising an in-phase (I), quadrature-phase (Q) signal pre-balancing component (IQPBAL) in the digital front end transmit path configured for mitigating I/Q phase and/or gain imbalances on each the fragment signal. Additionally, a DC removal component is preferably included for removing DC signal components of the feedback signal, the DC removal component comprising means for estimating the DC signal level and means for removing the DC estimation from the feedback signal.

In accordance with a still further aspect of the invention there is provided a method for compensating for phase and/or gain imbalances between two phasor fragment signals in a transmit path of an RF transmitter outputting an RF transmit signal based on a sum of the fragment signals. A zero base band transmit signal is transmitted along a transmit path during a calibration sequence defined by a predetermined number of iterations and a feedback signal correlated with a power level of the output RF transmit signal is received. The phase and/or gain of the phasor fragment signals is adjusted to minimize the power level, the adjusting being performed iteratively to the end of the calibration sequence and resulting in sequence phase and/or gain update signals for updating the phase and/or gain of data signals transmitted through the transmit signal path. Preferably, any portion of the feedback signal correlating to local oscillator and/or other non-imbalance feed through energy at the carrier frequency is removed by modulating the zero base band signal by a sub-carrier frequency signal and demodulating the feedback signal.

Preferably, the phase and/or gain adjusting is performed by alternating iterations of phase adjustments and iterations of gain adjustments. The phase adjusting may include producing a phase gradient calculated from the magnitude of the feedback signal, the sign of the differential of the phase adjustment from one iteration to the next iteration and the sign of the differential of the magnitude of the feedback signal from one iteration to the next iteration and the gain adjusting includes producing a gain gradient calculated from the magnitude of the feedback signal, the sign of the differential of the gain adjustment from one iteration to the next iteration and the sign of the differential of the magnitude of the feedback signal from one iteration to the next iteration.

Preferably, the gain update signal(s) are calculated so as to limit the magnitudes of the phasor fragment signals to a predetermined maximum value L and so that the magnitude of at least one of the phasor fragment signals has the value L.

BRIEF DESCRIPTION OF THE DRAWINGS

The invention will be understood by the skilled reader upon considering the following description of a preferred embodiment thereof, which is described with reference to the following drawings in which like references refer to like elements or components throughout.

DESCRIPTION OF A PREFERRED EMBODIMENT

Figure 1:
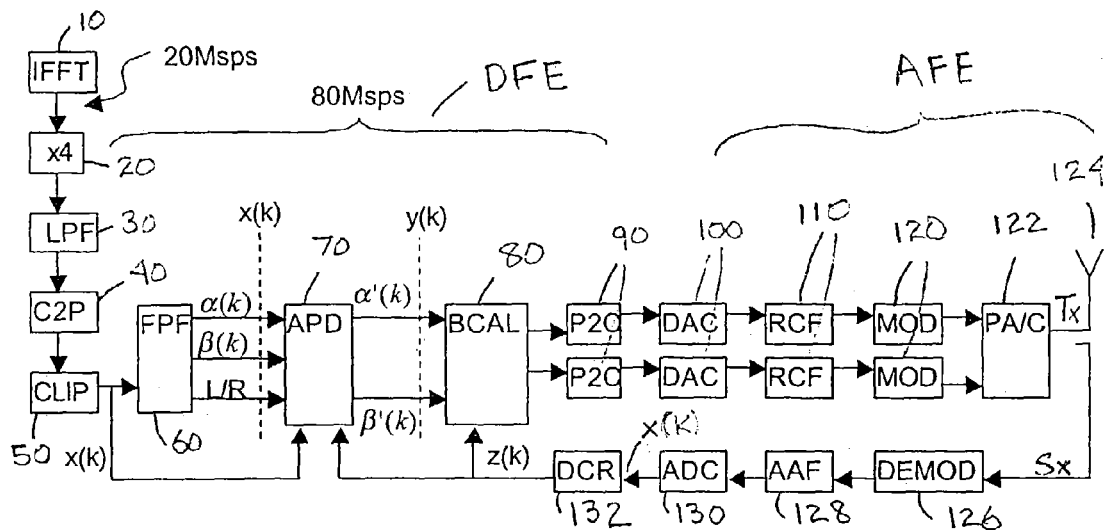
FIG. 1 depicts a block circuit diagram of a transmitter comprising a branch calibrator (BCAL), in accordance with the present invention, within the LINC (Linear amplification with Non-linear Components) digital transmit chain.

FIG. 1 is a block diagram of a transmitter circuit of which there is a digital front end (DFE) followed by analog circuitry (AFE) for RF modulation (up-conversion), power amplification and combining before transmission (radiation) from an antenna 124. As shown, in the digital front end an IFFT 10 block performs OFDM modulation on the information signal input thereto at the indicated rate of 20 Mega samples per second (Msps). An up-sampler component 20 increases the sample rate by four times to 80 Msps and the signal sample then passes through a low pass filter component 30. Cartesian-to-polar signal conversion 40 calculates the polar components corresponding to the quadrature (I and Q) signal components and a clipping process 50 clips signal peaks, both of these process being embedded within the phasor fragmenter component 60 (these being shown separately in FIG. 1 for illustrative purposes). The flipping phasor fragmenter (FPF) 60 (which is the subject of pending U.S. patent application Ser. No. 10/273,908 filed on 18 Oct. 2002 owned by the same assignee as this application) deconstructs the signal input thereto into independent branch fragment signals α(k), β(k) which, advantageously have lower peak-to-average power ratios than the input signal.

An adaptive pre-distorter (APD) 70 (options for which are described in a number of pending U.S. patent applications owned by the assignee of this application) uses a feedback sensed signal Sx, sensed from the RF output signal passed to the antenna 124, to detect and compensate for non-linear AM/AM and AM/PM distortion occurring in the RF signal paths leading to the PA/C. Advantageously, the branch calibrator (BCAL) 80 uses the same feedback sensed signal Sx to compensate for phase and gain imbalances between the two independent fragment signals which occur in the circuit path between the fragmenter and the summation node in the PA/C. Following the pre-distortion and calibration processing, a polar-to-cartesian converter 90 calculates the quadrature (I and Q) components for each fragment signal (the base band sampled in-phase and quadrature-phase components of each phasor fragment are identical to the real and imaginary components of the phasor) and these are passed to a digital-to-analog converter (DAC) 100 to convert each signal to an analog signal.

The analog circuitry of the transmitter of FIG. 1 includes low-pass reconstruction filters (RCF) 110, RF modulators (MOD) 120 and a power amplifier with combiner (PA/C) component 122 (which also accomplishes intermodulation filtering).

The branch calibrator (BCAL) 80 of the present invention, like the adaptive pre-distorter 70 in the illustrated transmitter of FIG. 1, operates on the time-domain complex signals input thereto at the DAC sampling rate of 80 Msps, these being signals α'(k) and β'(k) for the BCAL. The BCAL compensates for imbalances affecting the transmit signal by modifying the magnitude (gain) and phase of the complex time-domain phasor fragment signals through adjustment of the angles (phases) and magnitudes of the phasor fragment signals input thereto. It is to be noted that, conveniently, the information signal inputs and outputs of the BCAL are the angles of the phasor fragments (since a signal magnitude of unity is assumed). The effect of this calibration may be readily understood by viewing those angles in terms of the complex vector they represent.

Figure 2:
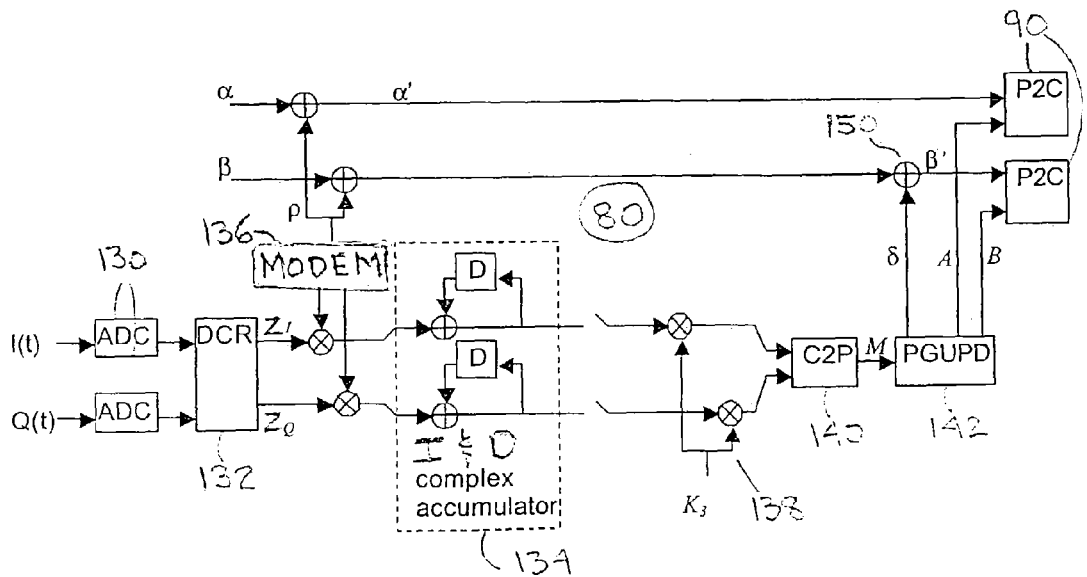
FIG. 2 depicts a block circuit diagram of the branch calibrator (BCAL) of FIG. 1 and its two main parts viz. a transmit part and a feedback part.

The input to the BCAL consists of the phase signals α'(k) and β'(k). These signals represent a sampled complex time-domain base band transmit signal y(k), where k denotes a digital sample time which relates to physical time t (seconds) and the sampling frequency F (Hertz) as t=k/F. It is to be noted that y(k) does not physically exist in any of the circuitry and is referenced only as being an equivalent joint representation of the signals α'(k) and β'(k)). As shown by FIG. 2, which shows in block diagram form the circuitry of the BCAL 80, the outputs of the BCAL also consist of the phase signals α'(k) and β'(k) plus gain update adjustment signals A and B.

The feedback sensed signal Sx is provided by signal sensing at the antenna 124 through a passive coupler, located in the RF transmit signal path just before a Rx/Tx switch for that antenna (it is to be understood, however, that the probe could be anywhere between the combiner output and the antenna and, less optimally could even be sensing the radiated signal). The sensed RF signal is filtered by a band pass filter (not illustrated in the drawings), demodulated to base band (DEMOD) 126, and RF images are filtered by analog anti-aliasing filters (AAF) 128. The so processed sensed signal is then digitized by the analog-to-digital converters (ADC) 130 after which the DC component is removed (DCR) 132. Complex digital base band samples enter the BCAL as z(k).

For purposes of the description of the branch calibrator 80 which follows below, some general information is now provided to review the conventional notations and parameters associated with the complex base band and complex envelope signals of an OFDM signal and, in particular, the RF OFDM signal used for the embodiment described herein which is defined by 52 sub-carriers in a 20 MHz wide channel (in conformity with the well-known IEEE 802.11a standard). The sub-carrier contents are defined by complex constellations and an IFFT operation. For any rate the complex or real channel spectrum is generally asymmetric around its centre. As a result, for any rate, the time domain RF envelope is complex. Notably, for BPSK (binary phase shift keyed) modulation the sub-carrier contents are real only, yet the spectrum is asymmetric, and the signal complex.

An RF signal r(t), in general, can be described as the real part of the complex modulation of a complex low-pass envelope c(t):

$$r(t)=Re\{c(t) \cdot \exp(j\pi f_c t)\}$$

$$=Re\{c(t)\} \cdot \cos(2\pi f_c t) - Im\{c(t)\} \cdot \sin(2\pi f_c t)$$

whereby $f_c$ is the carrier frequency. In the embodiment described herein, c(t) is the analog equivalent of the digital IFFT output, and $f_c$ is the channel centre frequency of approximately 5 GHz. The digital representation of c(t) is referred to herein as the digital base band signal, and it is complex. Further, $Re\{c(t)\}$ is the in-phase (I-) component of the RF envelope, and $Im\{c(t)\}$ is the quadrature phase (Q-) component.

If c(t) is written in polar coordinates, as c(t)=M(t)·expo(j∂(t)) then M(t) represents the Amplitude Modulation (AM) of the carrier, and ∂(t) represents the Phase Modulation (PM).

The phase fragmentation engine 60 uses appropriate signal processor means (e.g. a digital signal processor (DSP) or other means as are well-known to persons skilled in the art) to translate a complex signal sample x(k)=M(k)·exp(j∂(k)) to samples of a pair of phase signals α(k) and β(k). The individual phase signals are then translated to complex signals a(k) and b(k):

$$a(k)=\exp(j\alpha(k))/2$$

$$b(k)=\exp(j\beta(k))/2$$

The factor ½ in both expressions is merely a scaling factor limiting their sum to a(k)+b(k)≦1, assuming also that x(k)≦1. For each the real part is mapped to the RF in-phase (I) channel and the imaginary part to the RF quadrature (Q) channel. It is to be noted that exp(jα(k)) is termed a phasor and α(k) alone is termed an angle (phase). When the complex variable exp(jα(k)) is represented by a pair of variables representing the real and imaginary parts, it is termed a vector denoted a(k).

Signals a(k) and b(k) have constant magnitude, and it will be appreciated that this provides an advantage of the LINC architecture used. Both signals are then summed by the RF power amplification with combining (PA/C) circuitry to yield the desired (combined) RF signal representing the complex signal x(k).

As stated, the branch calibration (BCAL) circuit 80 provides means for mitigation of phase and gain imbalances between the two phasor fragment branches. The closed loop control circuit shown in FIG. 2 adjusts the phase (only) of one of the branches, viz. δ is added to the branch fragment p and individually the gain of each branch viz. adjustment signals A and B become the magnitudes of the vectors output from the polar-to-cartesian converters 90 (see FIG. 6). It will be understood by the skilled reader that, alternatively, in another embodiment the gain of only one branch could be adjusted rather than the gain on each branch. The adjustments are made such that during the transmission of zeros at base band, the two branches cancel out at the combiner with tolerable error. Advantageously, this calibration minimizes the AM/AM and AM/PM distortion due to the branch imbalance, and it minimizes the apparent carrier frequency leakage due to imperfect cancellation. Also advantageous, although the BCAL circuitry is separate from the APD, this architecture allows these two circuits to share the RF feedback circuitry and the feedback analog-to-digital converters (ADC's) 130.

It is to be noted that an operating assumption made is that digital gain adjustments at the input to the transmit DAC's 100 translate to signal level adjustments throughout the transmit path up to the combiner. Although switched-mode type power amplifiers (in the PA/C) are operated in this path, their switching characteristics must, to some degree, allow for gain adjustment of the signal level at the output of the amplifiers by adjusting the gain of the input signal. Alternatively, the analog front-end could (for a different implementation than that of the applicant's described herein) be designed to use the gain adjustments of the BCAL to adjust the supply voltage of the PA's.

Figure 3:
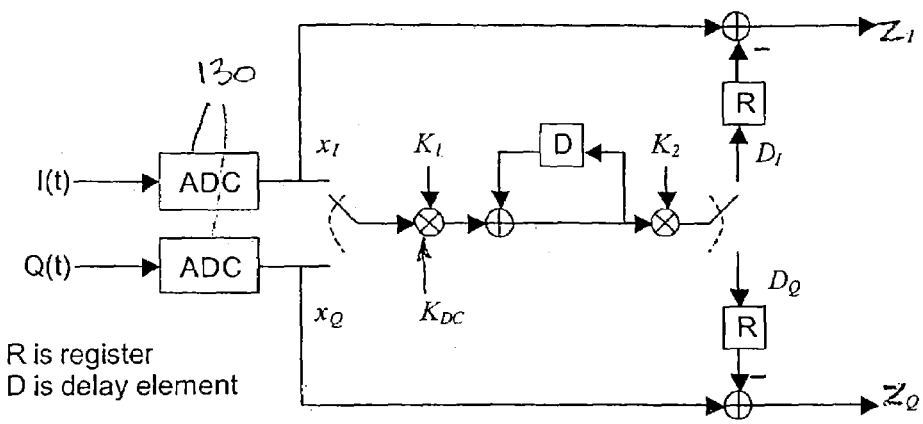
FIG. 3 depicts a block circuit diagram of the DC estimation and removal (DCR) circuitry of FIGS. 1 and 2.

In the feedback loop, the DC signal components at the feedback ADC's 130 are removed digitally prior to any use of the feedback signal by the BCAL. These DC components are present once the RF feedback circuitry is operational, and their level does not depend on the feedback or transmit signal levels. FIG. 3 shows the elements of the DC removal circuitry (DCR) 132 which performs an estimation of the DC for the in-phase (I) and quadrature-phase (Q) ADC's and a removal of this DC.

In operation, signal processing means performs the following cyclical processor steps for operation of the DCR 132:
1. Operate the RF feedback circuit without any of the RF transmission circuits;
2. Disable any DC removal;
3. At the in-phase (I) signal line and for the duration of $K_{DC}$ samples, whereby $K_{DC}$ is a power of 2, accumulate the output of the I-ADC output $x_1$, multiplied by a pre-accumulation factor $K_1$, whereby $K_1$ is a power of 2;
4. Multiply the output by a scaling factor $K_2$, whereby $K_2$ is a power of 2, and store the result as the In-Phase (I) DC estimate $D_I$;
5. Enable DC removal by subtracting $D_I$ from $x_I$ for all further feedback processing; and,
6. Switch to quadrature (Q) signal line, repeat steps 3 to 5 for the Q-ADC output $x_Q$.

Note: $K_{DC}$, $K_1$ and $K_2$ are selected to be a power of 2 as this permit use of a shifter rather than a multiplier and, thus, a simpler implementation.

The calibrator 80 adjusts the phase and gain on an alternating basis using a programmable period and a programmable duty cycle. During calibration, a zero base band signal is input to the phasor fragmenter 60 (this zero base band signal also being referred to in the art as a "quiet" base band signal). Alternatively, the phasor fragmenter 60 could be disabled and, in place of the fragmenter signals, the BCAL circuit 132 could generate two phasors with opposing angles so as to produce an equivalent "quiet" base band signal. This is based on the premise that two RF phasors with opposing angles at the combiner element of the PA/C 122 will sum to a quiet RF signal. Furthermore, any gain imbalance and phase imbalance, or a combination of both, leads to the generation of the RF carrier at the PA/C output. This effect is referred to herein as "imbalance leakage".

After demodulation 126 (down conversion), filtering 128 and analog-to-digital conversion 130 in the RF feedback circuitry, this imbalance leakage takes the form of a complex DC component in the digital feedback. The greater the imbalances are, the greater will be this resulting leakage signal, provided that a quiet signal is employed as stated. During a phase calibration cycle, the power at the PA/C 122 output is measured, and the phase of a designated fragment is varied until that power is minimized. During a gain calibration cycle, the power at the PA/C 122 output is measured, and the gains of the fragments are varied until that power is minimized. Through multiple iterations of these alternating phase and gain adjustments, the imbalance leakage is driven to near zero, at which time calibration is considered to be achieved.

As will be understood by the skilled reader, the degree of success of this calibration process is dependent on the "purity" of the imbalance leakage in that a lesser degree of success will result in the presence of "false" feed through signals in the form of LO (local oscillator) and/or other transmitted energy feed through at the carrier frequency, since such false feed through signals will also translate to a complex DC component at base band and, thus, mask the "true" imbalance feedback signal. These effect of these false feed through signals is referred to herein as "false leakage".

To address the effect of false leakage, and its negative effect on the calibration process of this invention, the inventor has developed means for enabling the calibration circuit to distinguish between the imbalance leakage and the false leakage. Specifically, as shown by FIG. 2, the quiet base band signal in the form of fragment signals α and β are digitally modulated by a carrier frequency within a 20 MHz transmit channel by a digital modulator/demodulator processing component 136. This digital modulation during quiet transmission generates modulated imbalance leakage energy at the modulation frequency which is in the range, for instance, of 1 MHz-8 MHz (for the 20 MHz wide Tx channel used of which from −8 MHz to +8 MHz can be used). This energy is translated back to DC in the digital feedback circuitry 130, 132 and 136 through demodulation by the modulator/demodulator 136. As a consequence, any false leakage at the carrier frequency is modulated away from DC. A suitable digital low-pass filter in the BCAL 80 then removes the modulated false leakage. It will be noted that if modulation is not enabled, any imbalance leakage would fall within a safe DC area but, with the modulation on, the imbalance may enter into a data part of the Tx channel (i.e. at a tone within the range 1 MHz-8 MHz) such that it would interfere with other traffic in that channel. When calibration is being performed, no data is transmitted but a interfering signal may be transmitted. Therefore, when the modulation is enabled, the processor also ensures that the channel is free before calibration is commenced. Also, it will be noted that this is not needed if an antenna switch is used and the PA transmits into a dummy load during this period instead of the antenna.

As shown by FIGS. 1 and, 2, the BCAL circuitry 80 comprises two main parts, namely, a transmit part and a feedback part. The transmit part generates the modulated quiet phasor fragment signal by means of polar modulation, as stated above. The modulating signal is generated by the digital modulator (MODEM) 136 which, in this embodiment, employs a numerically controlled oscillator (NCO) (but the skilled reader will be familiar with alternate devices that might instead be used). The quiet signal is then phase and gain adjusted by modifying the phase of the β branch as shown at adder 150, and by modifying the magnitudes of the polar-to-cartesian (P2C) circuits 90 using adjusting signals A and B (produced via the feedback part) which are input thereto. The Tx P2C circuits 90 perform polar- to-cartesian conversion for the α and β branch separately, using the respective phase and magnitudes from the BCAL 80 circuit (the signal properties being implicitly defined by the BCAL 80 output and IQPBAL 300 inputs—see FIG. 6).

The sensed feedback RF signal is brought to base band and low pass filtered by demodulation and anti-aliasing filters 126, 128, A/D converted by ADC's 130 and the DC component is removed by DCR 132. The BCAL 80 then performs decimation of the resulting signal representative of the imbalance leakage by means of a complex integrate and dump (I & D) accumulator 134 and a post I & D scaling factor $K_3$ is then applied, as shown in FIG. 2, prior to input to a cartesian-to-polar converter 140 (for example, the value of $K_3$ may be set to $1/W_{ID}$, where $W_{ID}$ is the I & D accumulation). As will be understood by the skilled reader, the magnitude at the output of the accumulator 134, therefore, constitutes a measure of the imbalance leakage which, in turn, is a measure of the power at the output of the PA/C 122. This power-correlated signal is then used as a metric in the phase and gain update circuit (PGUPD) 142 which operates at a decimated sampling rate dependent on the I & D accumulator 134 configuration.

Quiet modulation of the transmit signal, being a polar modulation, is accomplished by the modulator (MODEM) 136 by rotation of the phasor fragments while keeping their relative phase constant. The rotation is accomplished by adding a linearly increasing phase to the branch phases in an equal amount as follows:

$$\alpha'(k)=(\alpha(k)+\rho(k))\bmod 2\pi, \text{ and}$$

$$\beta'(k)=(\beta(k)+\rho(k))\bmod 2\pi$$

whereby the common rotation is:

$$\rho(k+1)=((\rho(k)+\rho_o)\bmod 2\pi.$$

The modulation frequency $f_O$ relates to the rotation increment $\rho_o$ as:

$$\rho_o=2\pi f_O/f_S$$

To obtain a modulation close to the channel edge, $f_O$=5 MHz, and for a DAC sampling rate of $f_s$=80 MHz, $\rho_o=\pi/8$ radians.

Quiet demodulation of the feedback $z_I$ and $z_Q$, being Cartesian modulation, is accomplished by the demodulator (MODEM) 136 by multiplying the feedback signal with a complex exponential as follows:

$$z'(k)=z(k)\cdot\exp(-j2\pi k f_O/f_S)$$

The feedback ADC sampling frequency $f_S$=80 MHz may differ from the transmit sampling frequency, but the modulation frequency $f_O$ must be identical. For $f_S$=5 MHz and an ADC sampling rate of $f_S$=80 MHz, a look-up table with 4 distinct entries is selected.

Table 1 below provides a few examples of the relationship between the accumulation window size and the BCAL update rate, for a feedback sampling rate $f_S$=80 MHz and $f_O$=5 MHz.

TABLE 1

BCAL Update Rate Examples

| I&D Accumulation window | BCAL update rate |
|---|---|
| 16 samples | 5 MHz |
| 32 samples | 2.5 MHz |
| 64 samples | 1.25 MHz |

The phase update value (signal) is based on a gradient calculated from:
a. the feedback magnitude,
b. the sign of the differential of the phase adjustment, and
c. the sign of the differential of the feedback magnitude.

The phase updating performed by the calibrator (using the signal processing means for operation/performance of the required steps), is as follows:
1. During ramp up of the power amplifier (PA/C), set the phase correction to $\delta=\delta_0$. This initial value is programmable. The default value is $\delta_0=0$.
2. Sample the I&D accumulated and decimated magnitude M.
3. Execute a quick branch flip if the output magnitude exceeds an alarm threshold, $M_0$ (which is programmable), by setting $\delta=\delta_0+\pi$.

At the start of the phase update interval:
4. 
   if executing the first phase update interval, set a phase gradient $\Gamma_\phi=M$
   otherwise, use the last applied gradient i.e. set $\Gamma_\phi=\Gamma_\phi$last.
5. Update the phase correction to $\delta(k+1)=\delta(k)-\mu_\phi\cdot\Gamma_\phi$, where $\mu_\phi$ is an update parameter, switchable between 4 programmed values. To accommodate rapid initial correction and fine final convergence, a look-up table for the parameter contains each possible parameter value and identifies an associated time slot and a selection circuit determines which value is applied based on the elapsed time.
6. Apply a phase correction to the β branch by modulo $2\pi$ addition:

$$\beta'=(\beta+\delta)\bmod 2\pi$$

For the remainder of the update interval, at each iteration of the control loop:
7. Calculate a phase correction differential sign $S_\phi$, as follows:
   $S_\phi=1$ if $\delta(k)>\delta(k-1)$, indicating that the phase was incremented, or,
   $S_\phi=-1$ if $\delta(k)\leq\delta(k-1)$, indicating that the phase was decremented.
8. Calculate a magnitude differential sign $S_M$, as follows:
   $S_M=1$ if $M(k)>M(k-1)$, indicating that the filtered and decimated feedback magnitude has incremented, or,
   $S_M=-1$ if $M(k)\leq M(k-1)$, indicating that the magnitude has decremented.
9. Calculate the gradient $\Gamma_\phi=M\cdot S_\phi\cdot S_M$ and
10. Update and apply the phase correction according to the foregoing.

The gain update signal is similar to the phase update signal in that it, too, is based on a gradient calculated from:
a. The feedback magnitude,
b. the sign of the differential of the gain adjustment, and
c. the sign of the differential of the feedback magnitude.

The gain adjustments effectively modify the magnitudes of the α and β branches, and these modifications are made such that the magnitudes never exceed a predetermined value L and such that at least one branch has the maximum magnitude of L, where L is a predetermined value, for example 1, selected so that the signal level at at least one DAC 100 of the DAC pair is pinned to a predetermined (i.e. pre-selected) level. That level could equal or be less than the maximum supported by the DAC 100 to ensure maximum use of the range of at least one of the two DAC's. To this end, a phantom gain parameter P is used to drive the magnitudes A and B of both respective branches such that:

$A=L, B<L$ iff $P>L$;

$A<L, B=L$ iff $P<L$; and, $A=L, B=L$ iff $P=L$.

The gain updating performed by the calibrator (BCAL) (using the signal processing means for operation/performance of the required steps), is as follows:
1. During ramp up of the power amplifier (PA/C), set the magnitudes for each of the two branches to $A=A_0$ and $B=B_0$. These initial values are programmable. Also, set the phantom gain P to the initial value $P=P_0$.
The default values are $A_0=L$, $B_0=L$ and $P_0=L$.
2. Sample the I&D filtered and decimated magnitude M.

At the start of the gain update interval:
3. if executing the first gain update interval, set the gain gradient to $\Gamma_P=M$,
otherwise, use the last applied gradient and set $\Gamma_P=\Gamma_P$ last
4. Update the phantom gain to $P(k+1)=P(k)-\mu_P \cdot \Gamma_P$, where $\mu_P$ is an update parameter, switchable between 4 programmed values (as shown more specifically by FIG. 5). To accommodate rapid initial correction and fine final convergence, a look-up table for this parameter contains each possible parameter value and identifies an associated time slot and a selection circuit determines which value is applied based on the elapsed time.
5. Calculate the balanced branch magnitudes based on a magnitude limit of L and a corresponding excess E, where:

$E=\max(0, P-L)$ $A=P-E$ $B=L-E$

For the remainder of the update interval, at each iteration of the control loop,
6. Calculate the gain correction differential sign:
$S_P=1$ if $P(k)>P(k-1)$, indicating that the phantom gain was incremented, or,
$S_P=-1$ if $P(k) \leq P(k-1)$, indicating that the phantom gain was decremented.
7. Calculate the magnitude differential sign:
$S_M=1$ if $M(k)>M(k-1)$, indicating that the filtered and decimated feedback magnitude has incremented, or,
$S_M=-1$ if $M(k)<M(k-1)$, indicating that the magnitude has decremented.
8. Calculate the gradient as and $\Gamma_P=M \cdot S_P \cdot S_M$.
9. Update and apply the gain correction according to the foregoing.

The foregoing phase and gain updates are applied in pairs and cycles, as follows:
a. one update cycle consists of a specified number of phase updates followed by a specified number of gain updates.
b. the complete update sequence consists of multiple cycles.

That is, alternating phase and gain adjustments (i.e a few iterations of gain and then a few iterations of phase, followed by a few more iterations of gain and then a few more iterations of phase etc. . . . ) are used in this embodiment (but it is to be understood that, alternatively, for a different embodiment, one might choose instead to perform all the phase iterations at once followed by all the gain iterations at once).

For this, the described embodiment uses a state machine (not being depicted by the drawings but for which the functionality, configuration and design will be understood by and apparent to the skilled reader) to perform the following sequence of operations of the BCAL and DCR circuits as follows:
1. Start at PHY-reset (i.e. reset the PHY control registers, "PHY" referring to the physical layer chip (IC) containing the digital base band processor, the calibration circuit and the RF circuits (except for the PA)).
2. Perform DC removal, as described above.
3. Ramp-up the RF transmit circuitry, including the PA/C.
4. Reset an update parameter counter.
5. Perform one I&D for a potential quick flip of the phase.
6. Perform phase updates to complete the specified number of phase updates per cycle.
7. Perform gain updates to complete the specified number of gain updates per cycle.
8. Repeat steps 6 and 7 to complete the specified number of cycles per update parameter.
9. Repeat steps 6, 7 and 8 to complete the specified number of cycles for all update parameter pairs.
10. Freeze the phase and magnitude calibration settings.

Examples of values that may be assigned to the phase and update parameters, MuP1-MuP4 and MuG1-MuG4, respectively, are ½, ¼, ⅛ and 1/16.

A polar and Cartesian modem switch is optionally used to allow for the quiet leakage to be modulated or not modulated at all.

Optionally, a monitoring/alarm component is included to monitor the decimated feedback magnitude after a specified calibration time and, if at any time after commencement of the monitoring, the feedback magnitude exceeds a threshold during more than a specified number of subsequent updates, an alarm is raised and the BCAL sequence is started a second time. Then, if another (second) alarm is raised the calibration is abandoned and the phase and magnitudes revert to their preset values and the occurrence of such a calibration failure is reported to the PHY. The main configuration parameters used by this component are: (i) an alarm threshold for decimated feedback magnitude; (ii) a waiting period after which monitoring commences; and (iii) a tolerable number of subsequent threshold violations.

Figure 4:
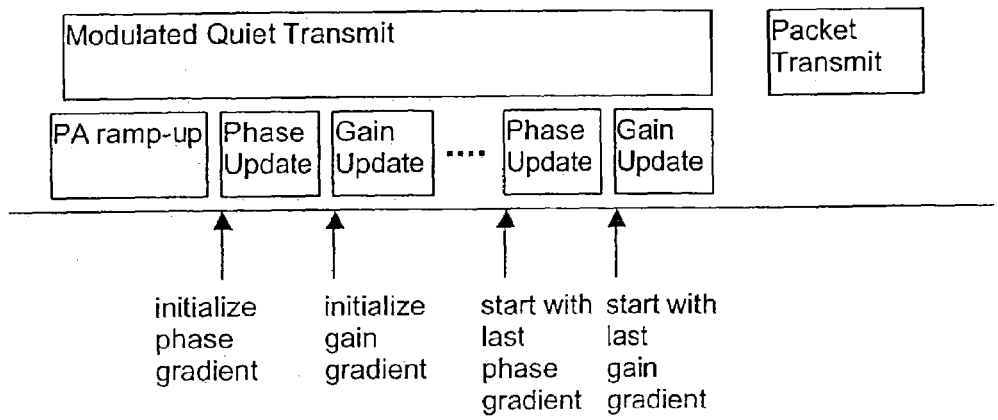
FIG. 4 depicts an overview of the gain and phase update scheduling performed by the "gain phase update" (GPUPD) engine (process module) of the branch calibrator of FIGS. 1 and 2.
Figure 5:
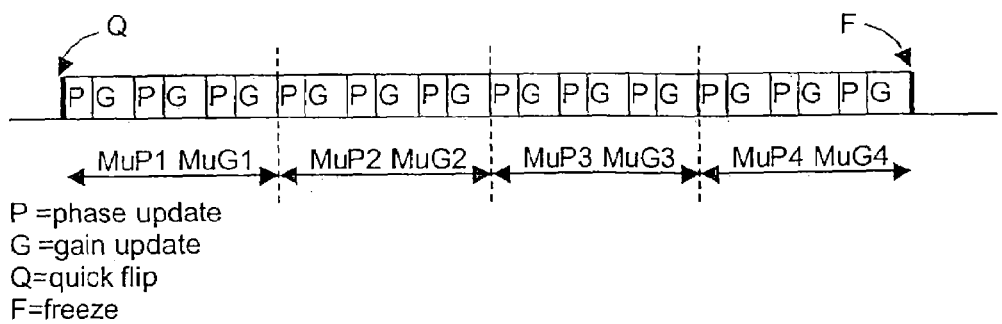
FIG. 5 depicts a sequence example of the gain phase update performed by the "gain phase update" (GPUPD) engine (process module) of the branch calibrator of FIGS. 1 and 2.

An overview of the calibration gain/phase update schedule is provided by FIG. 4 and a more detailed example of the operation of the BCAL 80 during the phase and gain update cycles is provided by FIG. 5. As shown, modulated quiet transmission occurs throughout the calibration process. For this illustrated example, 3 phase/gain update cycle pairs are used for each of four pairs of update parameters per operational period. Each update pair consists of a phase update cycle followed by a gain update cycle. The phase and gain update cycle durations are programmed as a number of updates. After each completion of an accumulation (corresponding to an I&D period), the scaled output of the I&D becomes the decimated magnitude and the update circuit (PGUPD) 142 is engaged once. For example, if 5 phase updates and 10 gain updates are assumed (at a modulation frequency of 5 MHz and a feedback ADC sampling rate of 80M Hz) there would be 16 feedback samples per period of a modulated false leakage signal. A suitable setting of the accumulation window would be an integer multiple of 16 samples, since such a setting would notch out the modulated false leakage signal. For noise averaging, $W_{ID}$ may be selected to be 40. As a result, the sampling frequency of the decimated magnitude is 2 MHz. Then, since the phase update cycle is 5 updates, and since the gain update cycle is 10 updates, one pair of update parameters is applied for 45 updates and the total branch calibration is then 180 updates long, or 90 µs.

Figure 6:
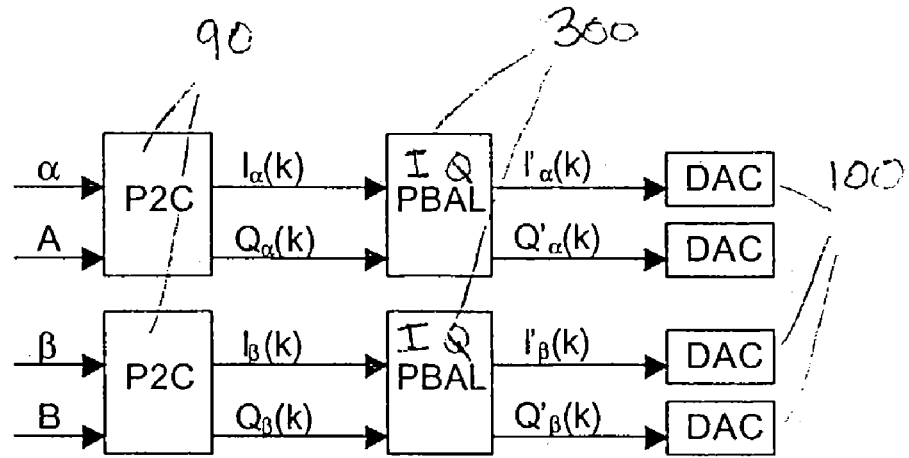
FIG. 6 depicts a block sub-circuit diagram showing an in-phase (I) and quadrature (Q) branch pre-balancing circuit (IQPBAL) between the polar-to-cartesian (P2C) component and digital-to-analog converter (DAC) component of FIG. 1 (this pre-balancing circuit not being separately shown in FIG. 1); and, FIG. 7 depicts a block circuit diagram of the in-phase (I) and quadrature (Q) branch pre-balancing circuit (IQPBAL) component shown in FIG. 6.

Optionally, an in-phase (I) and quadrature (Q) branch pre-balancing circuit (IQPBAL) 300 may be included in the transmit path, as shown by FIG. 6, to mitigate static and 1st order dynamic I/Q imbalances on each of the two phasor fragment branches (by "I/Q imbalance" it is meant both gain and phase imbalances between an I and Q signal pair). Pre-balancing minimizes the transmit impairments due to IQ phase and gain imbalances in the signal path from the feedback ADC's 130 to the output of the RF mixers 120. The adjustments are made based on separate programmed settings for each individual branch, and they are applied to the in-phase and quadrature base band signals after the Tx P2C circuits 90.

Figure 7:
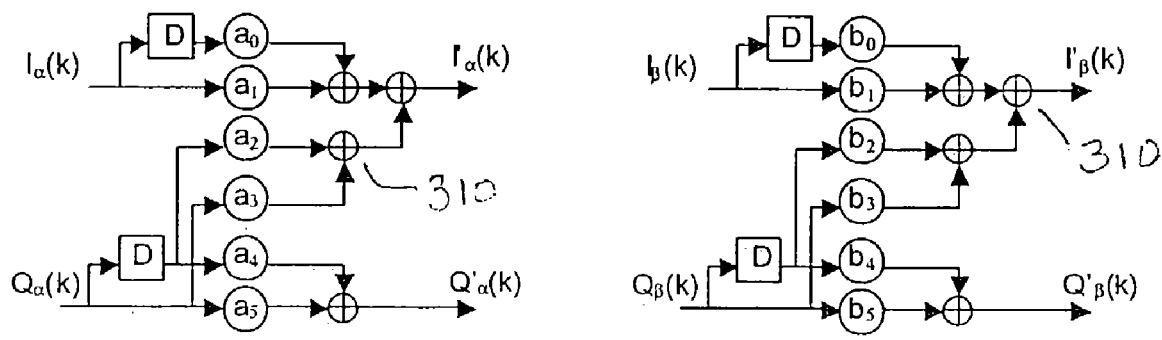

As shown by the circuit diagram of FIG. 7 for the IQPBAL 300, each of the two branches I and Q), includes 6 variable-coefficient multipliers ($a_0$-$a_5$ for fragment α and $b_0$-$b_5$ for fragment β) and adders 310 wherein the coefficients are programmable through register access. As shown, both circuits, α and β, provide three main paths: one from the in-phase input to the in-phase output, one from the quadrature input to the quadrature output, and one from the quadrature input to the in-phase output. Furthermore, both provide two sub-paths: one delayed sub-path and one immediate sub-path. The main paths provide I/Q pre-balancing wherein the immediate and delayed sub-paths provide static and 1st order dynamic correction, respectively.

The IQPBAL coefficients, $a_0$-$a_5$ and $b_0$-$b_5$, are calculated based on the gain and phase imbalances in the α and β branch, respectively. Consider the following imbalanced RF signal $r_\alpha(t)$ for the α branch:

$$r_\alpha(t)=I_\alpha(t)\cdot\cos(2\pi f_c t)-Q_\alpha(t)\cdot\sin(2\pi f_c t)$$

whereby $f_c$ is the carrier frequency. I/Q gain and phase imbalance would cause the RF signal to distort to:

$$r'_\alpha(t)=I'_\alpha(t)\cdot R_I\cdot\cos(2\pi f_c t)-Q'_\alpha(t)\cdot R_q\cdot\sin(2\pi f_c t+\phi)$$

The ratio $\lambda=R_I/R_q$ represents the gain imbalance, and $\phi$ represents the phase imbalance.

If $\lambda>1$ the static pre-balance coefficients are then:

$a_1=\cos(\phi)/\lambda$ $a_3=\sin(\phi)/\lambda$ and $a_5=1$ and if $\lambda\leq 1$ $a_1=\cos(\phi)$ $a_3=\sin(\phi)$ and $a_5=\lambda$ These choices pre-balance the signals at the DAC 100 inputs such that the phase and gain imbalance are undone at the mixer output, and such that at the DAC inputs the signals do not exceed +1 or −1:

$|I'_\alpha(k)|\leq 1, |Q'_\alpha(k)|\leq 1, |Q'_\beta(k)|\leq 1, |Q'_\beta(k)|\leq 1$ It is to be noted that the IQPBAL 300 does not determine the imbalance per se but, rather, provides means for pre-balancing. The foregoing restrictions hold for all pre-balance settings, provided the same signal restrictions hold at the IQPBAL inputs. The IQPBAL coefficients are calculated outside the IQPBAL circuit, for instance off-line. For static-only pre-balancing, the even coefficients $a_0$, $a_2$, $a_4$, $b_0$, $b_2$, $b_4$, are set to zero.

It is to be understood that all names assigned herein to parameters and signals, and specific ranges and formats indicated therefore, and the specific sequence example described herein, are for illustrative and understanding purposes only in connection with the exemplary embodiment are not to be construed in any manner to limit the scope of the invention claimed herein which is broader than any such example and neither defined by nor restricted thereto. Further, it is to be understood that all references to a component, module or circuit herein refers to electronic circuitry of appropriate and selectable configuration and may consist of separate circuit elements in combination or integrated elements to be chosen as desired for a given application.

The individual electronic and processing functions, components, modules and circuits utilised in the foregoing described embodiment are, individually, well understood by those skilled in the art. The present invention may be implemented as a combination of both hardware and software or entirely in hardware, as appropriate and desired. In particular, steps performed by the calibrator of the present invention can be implemented as a series of computer-readable instructions stored in a microprocessor. As stated, a state machine may be used, as and if desired, to control processes performed by the calibrator. A digital signal processor (DSP) is one form of digital processing means suitable for use in performing the numerically-intensive requirements of the calibrator but, as will be understood by persons skilled in the art, alternative signal processing means may, instead, be selected for use for another embodiment. Any computer readable instructions may, of course, be programmed in a procedural programming language (e.g. "C") or an object oriented language (e.g. "C++").

Although an exemplary embodiment of the invention has been disclosed herein for this specification, it will be apparent to those skilled in the art that various changes and modifications can be made without forfeiting the advantages of the invention and without departing from the intended scope of the invention. Alternative structures and embodiments or variations of the above may be conceived, all of which are intended to fall within the scope of the invention as defined in the claims that follow.

What is claimed is:

1. A digital branch calibrator for use in an RF transmitter to compensate for phase and/or gain imbalances between two phasor fragment signals in a transmit path from a phasor fragmenter in a digital front end of said transmitter to a power amplification and combining component in an analog front end of said transmitter outputting an RF transmit signal based on a sum of said fragment signals, said calibrator comprising:

(a) a closed loop controller operable during a calibration sequence, defined by a predetermined number of control loop iterations, and comprising transmit and feedback signal paths, said transmit signal path to transmit a zero base band transmit signal and said feedback signal path to receive a feedback signal correlated with a power level of said output RF transmit signal, said transmit signal path comprising a phase and/or gain adjusting component to adjust the phase and/or gain of said phasor fragment signals to minimize said power level, said adjusting being performed iteratively to the end of said calibration sequence and resulting in sequence phase and/or gain update signals, wherein said sequence update signals are provided for updating the phase and/or gain of data signals transmitted through said transmit signal path; and (b) digital signal processing means to operate said controller and to control said transmission of said zero base band transmit signal for processing by said calibrator;

wherein said closed loop controller further comprises false imbalance removal means to remove from said feedback signal any portion thereof correlating to local oscillator and/or other non-imbalance feed through energy at the carrier frequency, said false imbalance removal means comprising a digital modulator/demodulator to modulate said zero base band signal by a sub-carrier frequency signal and to demodulate said feedback signal; and wherein said phase and/or gain adjusting component comprises a complex accumulator to decimate said feedback signal.

2. A calibrator according to claim 1 wherein said phase and/or gain adjusting component is adapted to alternate iterations of phase adjustments and iterations of gain adjustments.

3. A calibrator according to claim 1 wherein said phase adjusting produces a phase gradient calculated from a magnitude of said feedback signal, a sign of a differential of a phase adjustment from one iteration to a next iteration and a sign of a differential of the magnitude of said feedback signal from one iteration to the next iteration and said gain adjusting produces a gain gradient calculated from the magnitude of said feedback signal, the sign of the differential of a gain adjustment from one iteration to the next iteration and the sign of the differential of the magnitude of said feedback signal from one iteration to the next iteration.

4. A calibrator according to claim 1 wherein said gain gradient(s) are calculated so as to limit the magnitudes of said phasor fragment signals to a predetermined maximum value L and so that the magnitude of at least one of said phasor fragment signals has the value L.

5. An RE transmitter having a Linear amplification with Nonlinear Components (LINC) architecture comprising;
   a digital front end with a fragmenter to fragment an input signal into a plurality of output fragment signals which sum to said input signal; and
   an analog front end of to amplify and combine said fragment signals;
   an in-phase (I), quadrature-phase (Q) signal pre-balancing component (IQPBAL) in the digital front end transmit path to mitigate I/Q phase and/or gain imbalances on each said fragment signal;
   a digital branch calibrator for use in an RF transmitter to compensate for phase and/or gain imbalances between two phasor fragment signals in a transmit path from a phasor fragmenter in a digital front end of said transmitter to a power amplification and combining component in an analog front end of said transmitter to output an RE transmit signal based on a sum of said fragment signals, the calibrator including:
   (a) a closed loop controller operable during a calibration secluence, defined by a predetermined number of control loop iterations, and comprising transmit and feedback signal paths, said transmit signal path to transmit a zero base band transmit signal and said feedback signal path to receive a feedback signal correlated with a power level of said output RF transmit signal, said transmit signal path comprising a phase and/or gain adjusting component to adjust the phase and/or gain of said phasor fragment signals to minimize said power level, said adiusting being performed iteratively to the end of said calibration sequence and resulting in sequence phase and/or gain update signals, where said sequence update signals arc provided to update the phase and/or gain of data signals transmitted through said transmit signal path; and (b) digital signal processing means to operate said controller and to control said transmission of said zero base band transmit signal for processing by said calibrator;

wherein said closed loop controller further comprises false imbalance removal means to remove from said feedback signal any portion thereof correlating to local oscillator and/or other non-imbalance feed through energy at the carrier frequency, said false imbalance removal means comprising a digital modulator/demodulator to modulate said zero base band signal by a sub-carrier frequency signal and to demodulate said feedback signal; and
   a DC removal component configured to remove DC signal components of said feedback signal, said DC removal component comprising means for estimating the DC signal level and means for removing said DC estimation from said feedback signal.

6. A method for compensating for phase and/or gain imbalances between two phasor fragment signals in a transmit path of an RF transmitter outputting an RF transmit signal based on a stun of said fragment signals, said method comprising:
   (a) transmitting a zero base band transmit signal along a transmit path during a calibration sequence defined by a predetermined number of iterations;
   (b) receiving a feedback signal correlated with a power level of said output RF transmit signal; and,
   (c) adjusting phase and/or gain of said phasor fragment signals to minimize said power level, said adjusting being performed iteratively to an end of said calibration sequence and resulting in sequence phase and/or gain update signals, where said sequence update signals are provided to update the phase and/or gain of data signals transmitted through said transmit signal path; and
   (d) removing from said feedback signal any portion thereof correlating to local oscillator and/or other non-imbalance feed through energy at the carrier frequency, said removing including modulating said zero base band signal by a sub-carrier frequency signal and demodulating said feedback signal;
   where said phase and/or gain adjusting includes alternating iterations of phase adjustments and iterations of gain adjustments.

7. A method to compensate for phase and/or gain imbalances between two phasor fragment signals in a transmit path of an RF transmitter outputting an RE transmit signal based on a sum of said fragment signals, said method comprising:
   (a) transmitting a zero base band transmit signal along a transmit path during a calibration sequence defined by a predetermined number of iterations;
   (b) receiving a feedback signal correlated with a power level of said output RE transmit signal; and, (c) adjusting a phase and/or gain of said phasor fragment signals to minimize said power level, said adjusting being performed iteratively to an end of said calibration sequence and resulting in sequence phase and/or gain update signals, where said sequence update signals are provided to update the phase and/or gain of data signals transmitted through said transmit signal path; and (d) removing from said feedback signal any portion thereof correlating to local oscillator and/or other non-imbalance feed through energy at the carrier frequency, said removing including modulating said zero base band signal by a sub-carrier frequency signal and demodulating said feedback signal;

where said adjusting includes producing a phase gradient calculated from a magnitude of said feedback signal, a sign of a differential of a phase adjustment from one iteration to a next iteration and a sign of a differential of the magnitude of said feedback signal from one iteration to the next iteration and where said adjusting includes producing a gain gradient calculated from the magnitude of said feedback signal, a sign of a differential of the a gain adjustment from one iteration to the next iteration and the sign of the differential of the magnitude of said feedback signal from one iteration to the next iteration.

8. A method to compensate for phase and/or gain imbalances between two phasor fragment signals in a transmit path of an RF transmitter outputting an RF transmit signal based on a sum of said fragment signals, said method comprising:

(a) transmitting a zero base band transmit signal along a transmit path during a calibration sequence defined by a predetermined number of iterations;

(b) receiving a feedback signal correlated with a power level of said output RF transmit signal; and, (c) adiusting a phase and/or gain of said phasor fragment signals to minimize said power level, said adiusting being performed iteratively to an end of said calibration sequence and resulting in sequence phase and/or gain update signals, where said sequence update signals are provided to update the phase and/or gain of data signals transmitted through said transmit signal path and (d) removing from said feedback signal any portion thereof correlating to local oscillator and/or other non-imbalance feed through energy at the carrier frequency, said removing including modulating said zero base band signal by a sub-carrier frequency signal and demodulating said feedback signal where said gain update signal(s) are calculated so as to limit magnitudes of said phasor fragment signals to a predetermined maximum value L and so that a magnitude of at least one of said phasor fragment signals has the value L.

* * * * *

UNITED STATES PATENT AND TRADEMARK OFFICE
CERTIFICATE OF CORRECTION

PATENT NO. : 7,280,612 B2  
APPLICATION NO. : 10/627881  
DATED : October 9, 2007  
INVENTOR(S) : Aryan Saed Page 1 of 1

It is certified that error appears in the above-identified patent and that said Letters Patent is hereby corrected as shown below:

At column 15, line 45, Claim 5, delete "RE" and insert -- RF --.

At column 15, line 46, Claim 5, delete "comprising;" and insert -- comprising: --.

At column 15, line 50, Claim 5, delete "of to" and insert -- to --.

At column 15, line 55, Claim 5, delete "signals;" and insert -- signal; --.

At column 15, line 62, Claim 5, delete "RE" and insert -- RF --.

At column 15, line 65, Claim 5, delete "secluence," and insert -- sequence, --.

At column 16, line 7, Claim 5, delete "adiusting" and insert -- adjusting --.

At column 16, line 11, Claim 5, delete "arc" and insert -- are --.

At column 16, line 35, Claim 6, delete "stun" and insert -- sum --.

At column 16, line 42, Claim 6, after "adjusting" insert -- a --.

At column 16, line 60, Claim 7, delete "RE" and insert -- RF --.

At column 16, line 67, Claim 7, delete "RE" and insert -- RF --.

At column 17, line 22, Claim 7, delete "the a" and insert -- a --.

At column 17, line 29, Claim 8, delete "signals." and insert -- signals, --.

At column 18, line 6, Claim 8, delete "adiusting" and insert -- adjusting --.

At column 18, line 7, Claim 8, delete "adiusting" and insert -- adjusting --.

At column 18, line 13, Claim 8, delete "path" and insert -- path; --.

At column 18, line 20, Claim 8, delete "signal" and insert -- signal; --.

Signed and Sealed this
Fifteenth Day of March, 2011

David J. Kappos
*Director of the United States Patent and Trademark Office*